(12) United States Patent
Takahara

(10) Patent No.: US 8,130,398 B2
(45) Date of Patent: Mar. 6, 2012

(54) JOB HANDLING IN IMAGE FORMING SYSTEM DURING POWER-OFF

(75) Inventor: Masakazu Takahara, Osaka (JP)

(73) Assignee: KYOCERA MITA Corporation, Osaka (JP)

( * ) Notice: Subject to any disclaimer, the term of this patent is extended or adjusted under 35 U.S.C. 154(b) by 1063 days.

(21) Appl. No.: 12/028,113

(22) Filed: Feb. 8, 2008

(65) Prior Publication Data

US 2009/0201529 A1 Aug. 13, 2009

(51) Int. Cl.
*G06F 3/12* (2006.01)
(52) U.S. Cl. ........................ 358/1.15; 358/1.14; 358/1.1
(58) Field of Classification Search .................. 358/1.15, 358/1.1
See application file for complete search history.

(56) References Cited

U.S. PATENT DOCUMENTS

| 2003/0048469 A1* | 3/2003 | Hanson ......................... 358/1.14 |
| 2003/0191975 A1* | 10/2003 | Kohara ......................... 713/300 |
| 2003/0214674 A1* | 11/2003 | Hamamoto et al. .......... 358/1.16 |
| 2004/0193899 A1* | 9/2004 | Satake et al. .................. 713/190 |
| 2004/0201866 A1* | 10/2004 | Maekawa et al. ............ 358/1.13 |
| 2005/0097198 A1* | 5/2005 | Getler et al. .................. 709/223 |

FOREIGN PATENT DOCUMENTS

| JP | 2001-096850 | 4/2001 |
| JP | 2004-216604 | 8/2004 |
| JP | 2005-319676 | 11/2005 |

* cited by examiner

*Primary Examiner* — Benny Tieu
*Assistant Examiner* — Martin Mushambo
(74) *Attorney, Agent, or Firm* — Connolly Bove Lodge & Hutz LLP

(57) ABSTRACT

An image forming system includes an image forming apparatus connected to a host device via a network. The host device transmits a power-off notification notifying the image forming apparatus on the network that power is to be turned off, together with job information identifying a job, when the host device is powered off. The image forming apparatus searches whether or not there is a job identified by the job information upon receiving the power-off notification from the host device, reads the job identified by the job information out from a job saving unit, transmits the job to the host device and deletes the job that has been transmitted to the host device, from the job saving unit. Further, the host device saves the job transmitted from the image forming apparatus that has received the power-off notification, in a storing unit, and then turns off the power.

16 Claims, 9 Drawing Sheets

JOB HANDLING IN IMAGE FORMING SYSTEM DURING POWER-OFF

BACKGROUND OF THE INVENTION

1. Field of the Invention

The present invention relates to an image forming system, apparatus, method and control program in which, for example, a plurality of image forming apparatuses such as printers, copiers, facsimile apparatuses, and multifunction products are connected to a host computer via a network, an image forming apparatus, and a control program.

2. Description of the Background Art

In recent years, computer networks have proliferated and in many offices LANs which connect a plurality of information devices, such as computers and printers, together have been built. With the proliferation of peripheral devices such as computers, printers, scanners, and digital cameras, networks such as LANs also proliferate. By sharing a printer, a modem, and an image reading apparatus on a network, an environment in which various apparatuses on the network can be used is implemented.

Conventionally, in the background art, a printing system has been widely used in which an instruction is transmitted to a printing apparatus such as a printer from a host device such as a computer to cause the printing apparatus to print text or graphics or to modify the print format or make settings on the printing apparatus itself.

For example, background art Japanese Patent Application Laid-Open No. 2001-096850 suggests a case where a host device transmits an instruction, including print data and a power-off command, to a printing apparatus. The host device receives information on a state of the printing apparatus to be transmitted from the printing apparatus and, in a case where the printing apparatus receives an instruction transmitted from the host device and the received instruction includes a power-off command, the printing apparatus: performs a stop process, such as a print head maintenance process; transmits state information to the host device; and performs a power supply stop process. As another example Japanese Patent Application Laid-Open No. 2004-216604 suggests a printing apparatus capable of temporarily storing print data in a non-volatile storage apparatus and having a print controlling unit that holds print data received from a host and information on the print data even after the power is turned off.

In yet another background art example, Japanese Patent Application Laid-Open No. 2005-319673 suggests including printers and a host device connected to each other, in which in a case where there are a plurality of printers in the same environment, further including a printer among the plurality of printers present in the same environment which does not have a storage medium, is provided an area of a storage medium of a registered printer having a mass storage medium that enables the printer which does not have a storage medium to perform printing using the mass storage medium and, upon power on, by sharing the mass storage medium with the registered printer, memory corruption or the like is dealt with.

A problem with the background art discussed above is that, in an image forming apparatus which does not have a mass storage medium, there is a possibility that jobs being saved may be left for a long period of time and thus, the capacity of a storage medium maybe cluttered. Moreover, in such background art image forming apparatus provided with a facsimile or the like, it is often the case that the power to the apparatus is left turned on for 24 hours. Therefore, in such an image forming apparatus which does not have a security function, there is a possibility that jobs saved in a memory (e.g., Hard disk drive (HDD) or the like) in the image forming apparatus may be obtained by being accessed from outside and security of such jobs/information could be compromised.

SUMMARY OF THE INVENTION

In view of the aforementioned conventional background art problems, an object of the present invention is therefore to provide an image forming system, an image forming apparatus, and a control program which are capable of improving security by avoiding jobs from being left in an image forming apparatus.

Other objects of the present invention and specific advantages to be obtained by the present invention will become more apparent from the following description of an embodiment.

In one embodiment of invention, by uploading a job from an image forming apparatus at a time when the power to a host device, which is the holder of the job, is turned off, jobs being left in the image forming apparatus is avoided.

Specifically, an image forming system according to the present invention includes: a host device; and an image forming apparatus connected to the host device via a network, the host device further comprising: a host device side communicating unit that communicates with the image forming apparatus via the network; a storing unit that saves a job; and a host device side controlling unit that transmits a power-off notification that notifies the image forming apparatus on the network via the host device side communicating unit that the power is to be turned off and transmits job information identifying a job when turning off the power, saves the job transmitted from the image forming apparatus that has received the power-off notification in the storing unit, and turns off the power, and the image forming apparatus further comprising: a job saving unit that saves a job; an image forming apparatus side communicating unit that communicates with the host device via the network; and an image forming apparatus side controlling unit that determines whether there is the job identified by the job information upon receiving the power-off notification from the host device via the image forming apparatus side communicating unit, reads the job identified by the job information out from the job saving unit, causes the image forming apparatus side communicating unit to transmit the job to the host device, and deletes the job transmitted to the host device from the job saving unit.

By adopting such a configuration, in the image forming system, when the power to the host device is turned off, an end process is performed in which a job saved in an image forming apparatus on the network is uploaded to the host device.

In another embodiment of the image forming system, the host device side controlling unit causes the host device side communicating unit to transmit a job saving completion notification that notifies the image forming apparatus that saving of the job has been completed, after saving the job identified by the job information and transmitted from the image forming apparatus that has received the power-off notification in the storing unit; the image forming apparatus side controlling unit deletes the job transmitted to the host device from the job saving unit after receiving the job saving completion notification from the host device, and causes the image forming apparatus side communicating unit to transmit a job deletion completion notification that notifies the host device that deletion of the job has been completed; and the host device side controlling unit turns off the power after receiving the job deletion completion notification from the image forming apparatus.

In another embodiment of the image forming system, the host device side controlling unit transmits a power-on notification that notifies the image forming apparatus on the network that the power is turned on by the host device side communicating unit when turning on the power; the image forming apparatus side controlling unit identifies the job taken up when the host device is powered off by the job information received upon the power-on notification from the host device, and causes the image forming apparatus side communicating unit to transmit a job transmission request requesting the host device to transmit the job; the host device side controlling unit determines whether or not there is a job identified by the job information in response to the job transmission request, and causes the host device side communicating unit to transmit the job identified by the job information to the image forming apparatus; and the image forming apparatus side controlling unit saves the job identified by the job information and transmitted from the host device that has received the job transmission request in the job saving unit.

By adopting such a configuration in the image forming system when the power to the host device is turned on, a start process is performed in which a job that was uploaded from an image forming apparatus on the network by the end process when the power to the host device is turned off is returned to its original saving state in the image forming apparatus.

Furthermore, in yet another embodiment of the image forming system, the image forming apparatus side controlling unit causes the image forming apparatus side communicating unit to transmit a polling request to a plurality of host devices on the network; and respective host device side controlling units of the plurality of host devices on the network causes the host device side communicating units to transmit the power-on notification or the power-off notification in response to the polling request.

Yet another embodiment is directed to an image forming apparatus in an image forming system in which the image forming apparatus is connected to a host device via a network, the image forming apparatus including: a job saving unit that saves a job; an image forming apparatus side communicating unit that communicates with the host device via the network; and an image forming apparatus side controlling unit that determines whether there is a job identified by job information upon receiving a power-off notification from the host device by the image forming apparatus side communicating unit, reads the job identified by the job information out from the job saving unit, causes the image forming apparatus side communicating unit to transmit the job to the host device and deletes the job that has been transmitted to the host device from the job saving unit.

Another embodiment is directed to a recording medium storing a control program for an image forming system that includes an image forming apparatus connected to a host device via a network, the program causing: a computer disposed in the host device to transmit a power-off notification that notifies the image forming apparatus on the network that power is to be turned off, with and to transmit job information identifying a job when the host device is powered off; a computer disposed in the image forming apparatus to determine whether there is a job identified by the job information upon receiving the power-off notification from the host device, to read the job identified by the job information out from a job saving unit, to transmit the job to the host device and to delete the job that has been transmitted to the host device from the job saving unit; and the computer disposed in the host device, to save the job transmitted from the image forming apparatus that has received the power-off notification in a storing unit, and to turn off the power.

Yet another embodiment is also directed to a recording medium storing a control program for a host device in an image forming system that includes an image forming apparatus connected to the host device via a network, the control program causing a computer disposed in the host device to transmit a power-off notification notifying the image forming apparatus on the network that the power is to be turned off and to transmit job information identifying a job when the host device is powered off, to save the job identified by the job information and transmitted from the image forming apparatus that has received the power-off notification in a storing unit, and to turn off the power.

In the embodiments discussed above, by transmitting data saved in an image forming apparatus to a host device which saves the data at, for example: nighttime, when a user goes home, during a long vacation, when a certain period of time has elapsed, or at a specified date and time, the image forming apparatus can be brought into a state in which there are no jobs in the image forming apparatus.

Namely, according to the embodiments of the invention discussed above, since a job is taken up from a printing apparatus at a time at which the power to a host device, which is the holder of the job is turned off, an image forming system that avoids jobs from being left in an image forming apparatus can be provided. Accordingly, an improvement in security can be achieved.

DESCRIPTION OF THE PREFERRED EMBODIMENT

An embodiment of the present invention will be described in detail below with reference to the drawings. It is to be understood that the present invention is not limited to the following embodiment and, needless to say, any change can be made to the embodiment without departing from the spirit and scope of the present invention.

Figure 1:
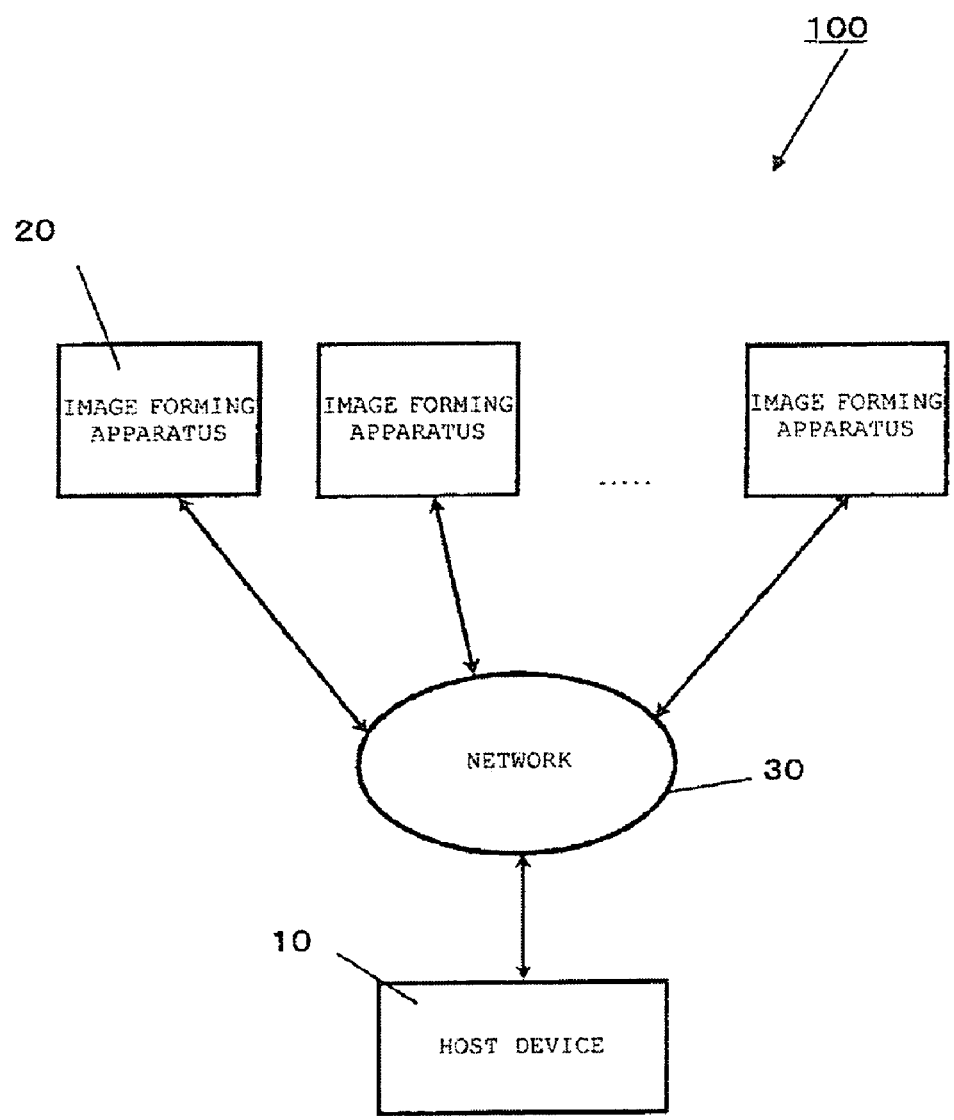
FIG. 1 is a block diagram showing a configuration of an image forming system to which the present invention is applied.

The present invention is applied, for example, to an image forming system 100, as shown in FIG. 1, in which a host device 10 and image forming apparatuses 20 are mutually communicably connected to each other via a network 30 such as a LAN.

Figure 2:
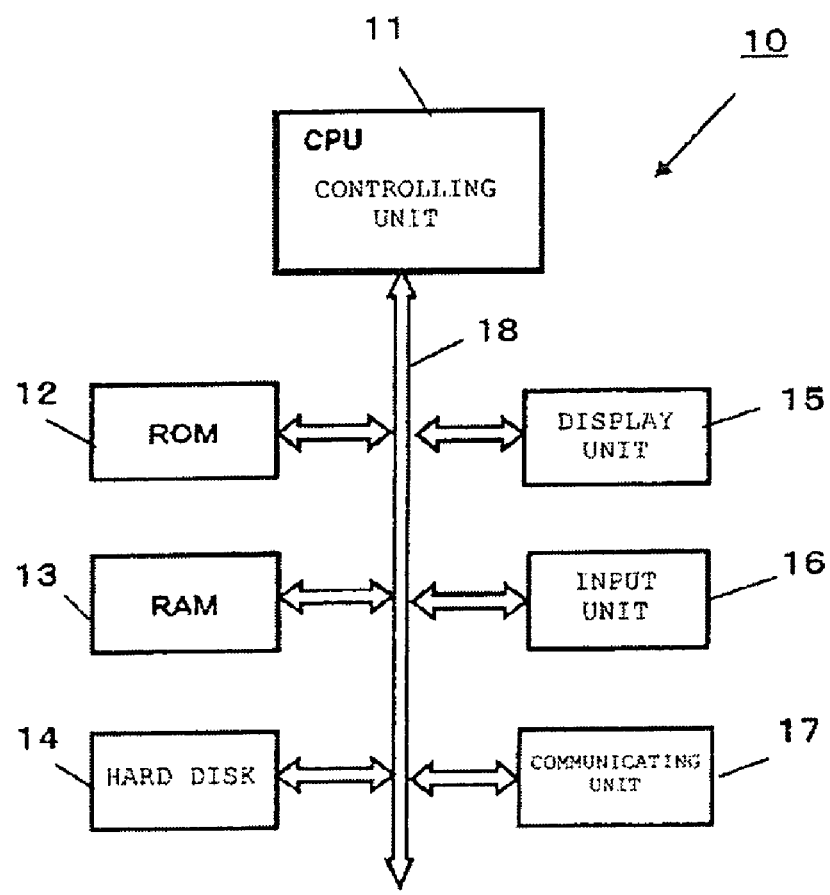
FIG. 2 is a block diagram showing a configuration of a host device in the image forming system.

In the image forming system 100, the host device 10 is composed of a so-called personal computer, for example. As shown in FIG. 2, the host device 10 includes a controlling unit 11 composed of a CPU (Central Processing Unit) that executes instructions configured to cause and provide control of the entire system, apparatus, method and various arithmetic operations, a ROM (Read Only Memory) 12 for storing a control program and data, a RAM (Random Access Memory) 13 for temporarily storing a program and data as a work area, a hard disk 14 serving as an external storage apparatus for saving various programs and data, a display unit 15, such as a liquid crystal display, for displaying various information, an input unit 16 composed of a keyboard, a mouse, and the like, for inputting various instructions, a communicating unit 17 composed of a network interface, such as a LAN card, for establishing a connection to the network 30, and the like, which are interconnected via a bus 18.

Figure 3:
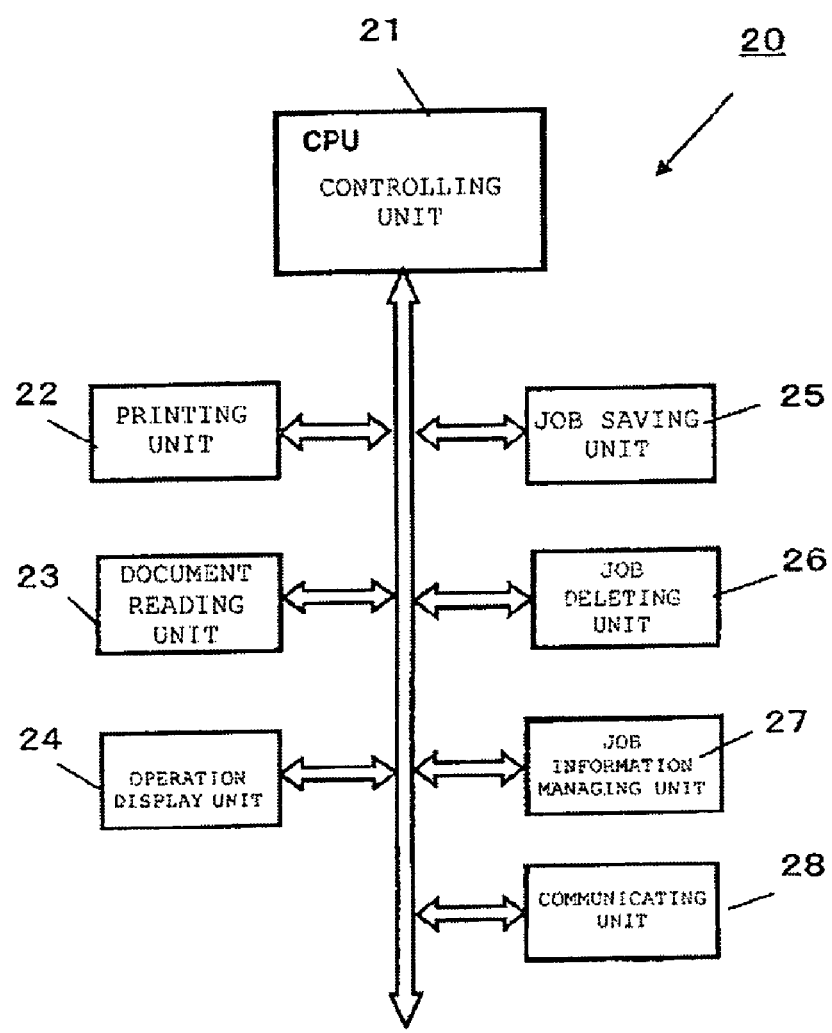
FIG. 3 is a block diagram showing a configuration of an image forming apparatus in the image forming system.

The image forming apparatuses 20 each are a so-called multifunction product having copying, printing, scanning, facsimile transmission, and facsimile reception functions and include, as shown in FIG. 3, a controlling unit 21 including, as a main component, a CPU that performs operational control of the entire apparatus. To the controlling unit 21 are connected a printing unit 22, a document reading unit 23, an operation display unit 24, a job saving unit 25, a job deleting unit 26, a job information managing unit 27, a communicating unit 28 composed of a network interface, such as a LAN card, for establishing a connection to the network 30, and the like.

Figure 4:
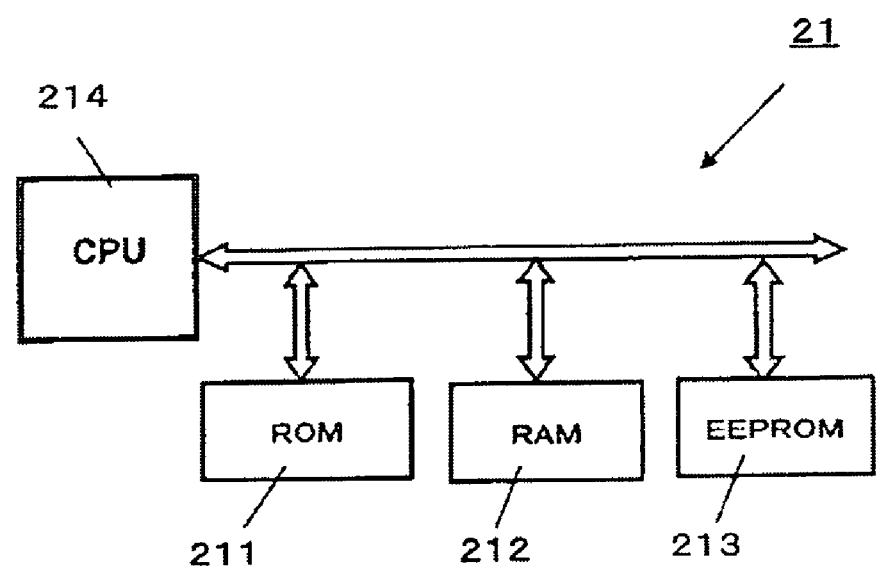
FIG. 4 is a block diagram showing an exemplary configuration of a controlling unit of the image forming apparatus.

As shown in FIG. 4, the controlling unit 21 includes a ROM 211 that stores a control program and/or data of an image forming apparatus 20; a RAM 212 that temporarily stores program and/or data; an EEPROM (Electrically Erasable Programmable ROM) 213 that stores various programs, updatable setting data and the like; a microcomputer 214 that reads out and executes the control program and the like from the ROM 211, RAM 212, EEPROM 213; and the like. The controlling unit 21 controls the entire apparatus according to predetermined instruction information inputted from the operation display unit 24 or the like or detection signals from various sensors provided at various locations of the apparatus.

The printing unit 22 performs an image forming process in which a job is printed on an output sheet, and includes a printer controller, a laser scanning unit, fixing rollers, and the like, which are not shown.

The document reading unit 23 reads a document and generates image data corresponding to the document. The document reading unit 23 includes a scanner having a CCD (Charge Coupled Device) sensor, an exposure lamp, and the like, which generates image data from an image of a document which is optically obtained; a contact glass; and the like. The document reading unit 23 outputs to the controlling unit 21 image data obtained by scanning a document placed on the contact glass.

The operation display unit 24 performs a predetermined instruction input according to a user's operation and includes, although not shown, a start key used by a user to input a print execution instruction; a ten-key pad used to input the number of copies or the like; and a liquid crystal display (LCD) that displays various operation buttons and the like which display operation guide information for inputting settings of various copying operations and the like.

The job saving unit 25 saves a job for which a user has made a saving request to the image forming apparatus 20.

The job deleting unit 26 performs a process of deleting a job saved in the job saving unit 25, according to an instruction from the controlling unit 21. In the image forming apparatus 20, in response to a host power-off notification, the job deleting unit 26 reads a job out from the job saving unit 25 and transmits the job to the host device 10 and then deletes the transmitted job from the job saving unit 25. Note that the process of deleting a job may be a process in which a recording area of the job is released and overwriting of the recording area is allowed.

The job information managing unit 27 manages jobs saved in the image forming apparatus 20. Job saving host information (IP addresses and the like.) associated with the jobs is also managed by the job information managing unit 27.

The communicating unit 28 transmits/receives a job to/from the host device 10 via the network 30.

Figure 5:
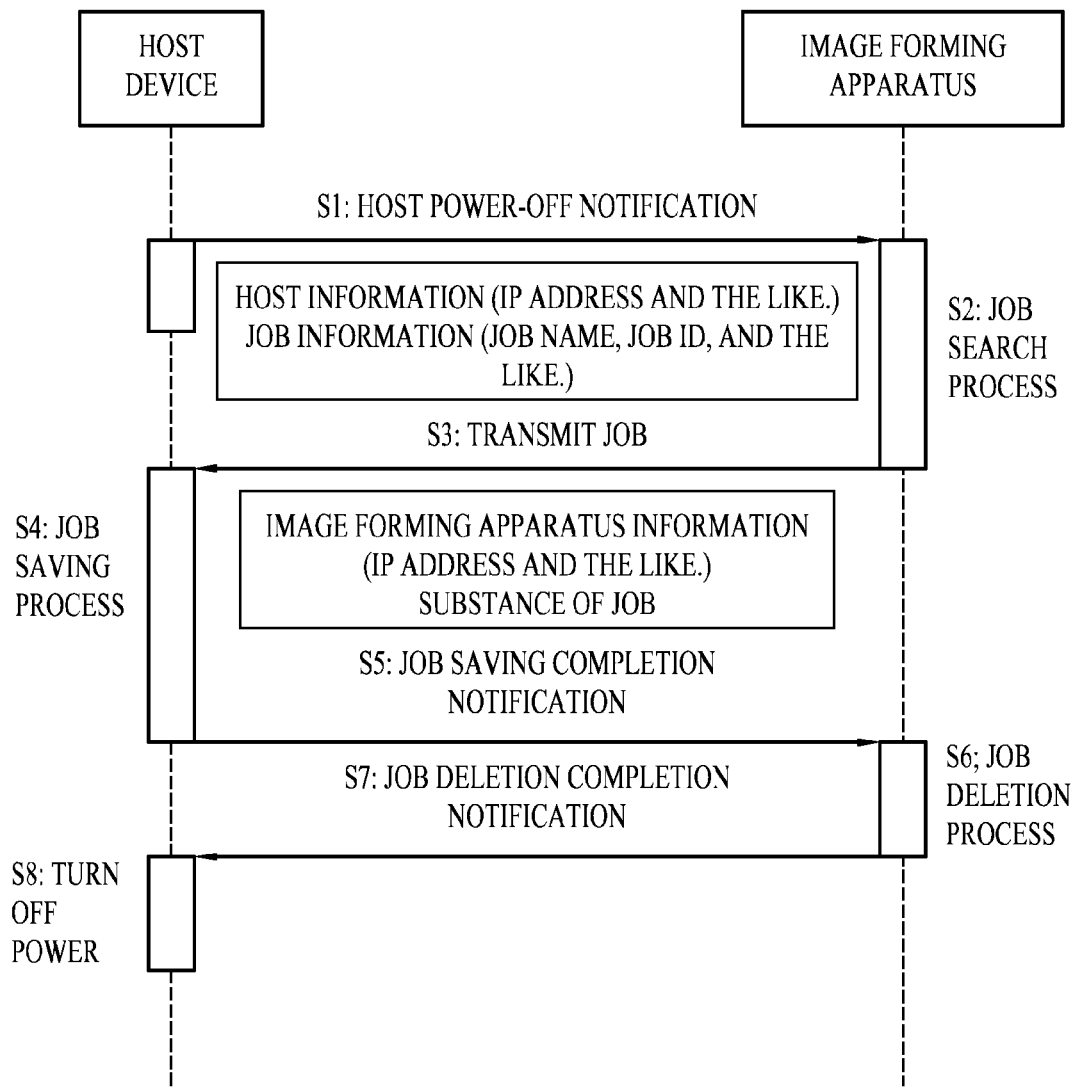
FIG. 5 is a flowchart showing steps of an end process in the image forming system.
Figure 8:
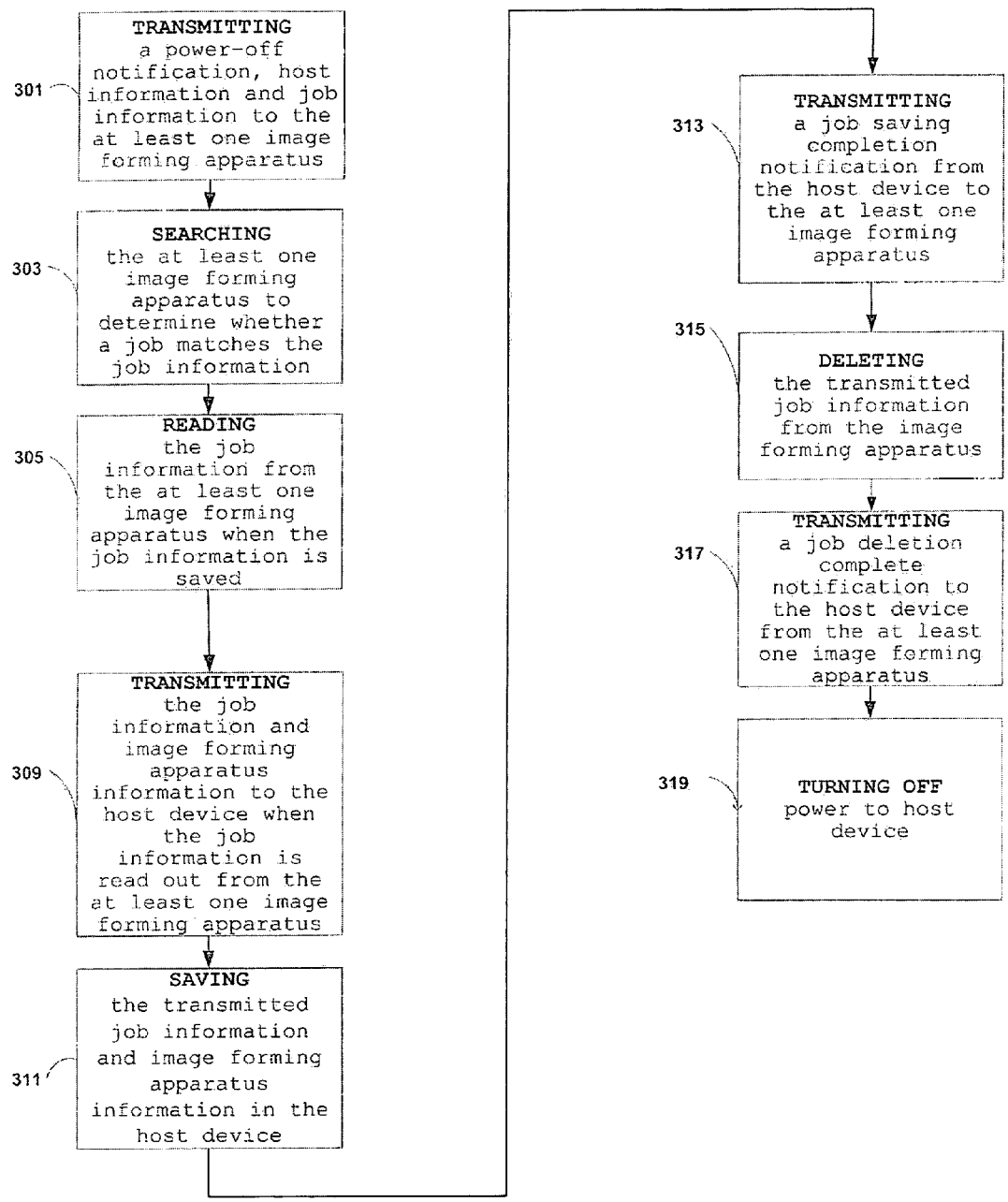
FIG. 8 is a flowchart of an exemplary embodiment of a method for powering-off an image forming system.

In the image forming system 100, when the power to the host device 10 is turned off, the controlling unit 11 of the host device 10 and the respective controlling units 21 of the image forming apparatuses 20 perform an end process according to control programs and steps shown in a flowchart of FIG. 5 and FIG. 8.

Specifically, when the host device 10 is powered off, first, the controlling unit 11 of the host device 10 transmits a power-off notification notifying the image forming apparatuses 20 on the network 30 via the communicating unit 17 that the power is to be turned off (step S1). At this time, the controlling unit 11 of the host device 10 also transmits host information such as an IP address and job information such as a job name and a job ID, together with the power-off notification, to the image forming apparatuses 20, as shown at 301 of FIG. 8.

When the respective controlling units 21 of the image forming apparatuses 20 on the network 30 receive the power-off notification from the host device 10, each controlling unit 21 searches the job saving unit 25 to determine whether a job that matches the job information transmitted from the host device 10 is saved in its job saving unit 25 (step S2),and as shown at 303 of FIG. 8. If the job is saved, then the controlling unit 21 reads the job out from the job saving unit 25 and causes the communicating unit 28 to transmit the job to the host device 10 (step S3), and as shown at 305 of FIG. 8. At this time, the controlling unit 21 transmits image forming apparatus information such as an IP address of the image forming apparatus 20, together with the job, to the host device 10, as shown at 309 of FIG. 8.

Then, the controlling unit 11 of the host device 10 saves the job transmitted from the image forming apparatus 20, on the hard disk 14, for example (step S4), and as shown at 311 of FIG. 8. When the controlling unit 11 of the host device 10 has completed the saving of the job, the controlling unit 11 causes the communicating unit 17 to transmit a job saving completion notification notifying the image forming apparatus 20 that has transmitted the saved job that the saving of the job has been completed (step S5), and as shown at 313 of FIG. 8.

When the job saving completion notification has been transmitted to the image forming apparatus 20 from the host device 10, the controlling unit 21 of the image forming apparatus 20 deletes the job from the job saving unit 25 by the job deleting unit 26 (step S6), and as shown at 315 of FIG. 8. When the deletion of the job has been completed, the controlling unit 21 of the image forming apparatus 20 causes the communicating unit 28 to transmit a job deletion completion notification notifying the host device 10 that the deletion of the job has been completed (step S7), and as shown at 317 of FIG. 8.

When the controlling unit 11 of the host device 10 has received the job deletion completion notification from the image forming apparatus 20, the controlling unit 11 of the host device 10 turns off the power (step S8), and as shown at 319 of FIG. 8.

Specifically, the host device 10 in the image forming system 100 includes the controlling unit 11 that transmits a power-off notification notifying the image forming apparatuses 20 on the network 30 via the communicating unit 17 that the power is to be turned off, together with job information identifying a job, when turning off the power (step S1), to save the job identified by the job information and transmitted from an image forming apparatus 20 that has received the power-off notification (step S4), and then, to turn off the power (step S5). The host device 10 causes the controlling unit 11 to perform an end process in which a job saved in an image forming apparatus 20 on the network is taken up, when the power is turned off.

In the image forming system 100, the controlling unit 11 of the host device 10 further causes the communicating unit 17 to transmit a job saving completion notification notifying the image forming apparatus 20 that the saving of the job has been completed (step S5), after saving the job identified by the job information and transmitted from an image forming apparatus 20 that has received the power-off notification (step S4), and to turn off the power (step S8) after receiving a job deletion completion notification notifying that the deletion of the job has been completed, which is transmitted from the image forming apparatus 20 that has received the job saving completion notification.

Each image forming apparatus 20 in the image forming system 100 includes a controlling unit 21 that searches the image forming system to determine whether or not there is a job identified by job information, upon receiving a power-off notification notifying that the power is to be turned off, together with the job information identifying a job, which are transmitted from the host device 10 when turning off the power (step S2), to read the job identified by the job information out from a job saving unit 25 and cause a communicating unit 28 to transmit the job to the host device 10 (step S3), and to delete the job transmitted to the host device 10 from the job saving unit 25 by a job deleting unit 26 (step S6). When the host device 10 is powered off, the controlling unit 21 performs an end process in which a job identified by job information is read out from the job saving unit 25 and transmitted to the host device 10, and then, the job transmitted to the host device 10 is deleted from the job saving unit 25.

In the image forming system 100, the controlling unit 21 of the image forming apparatus 20 further deletes the job transmitted to the host device 10 from the job saving unit 25 after receiving a job saving completion notification notifying that saving of the job has been completed, which is transmitted from the host device 10 that has saved the job identified by the job information (step S6), and to cause the communicating unit 28 to transmit a job deletion completion notification notifying the host device 10 that the deletion of the job has been completed (step S7).

Figure 6:
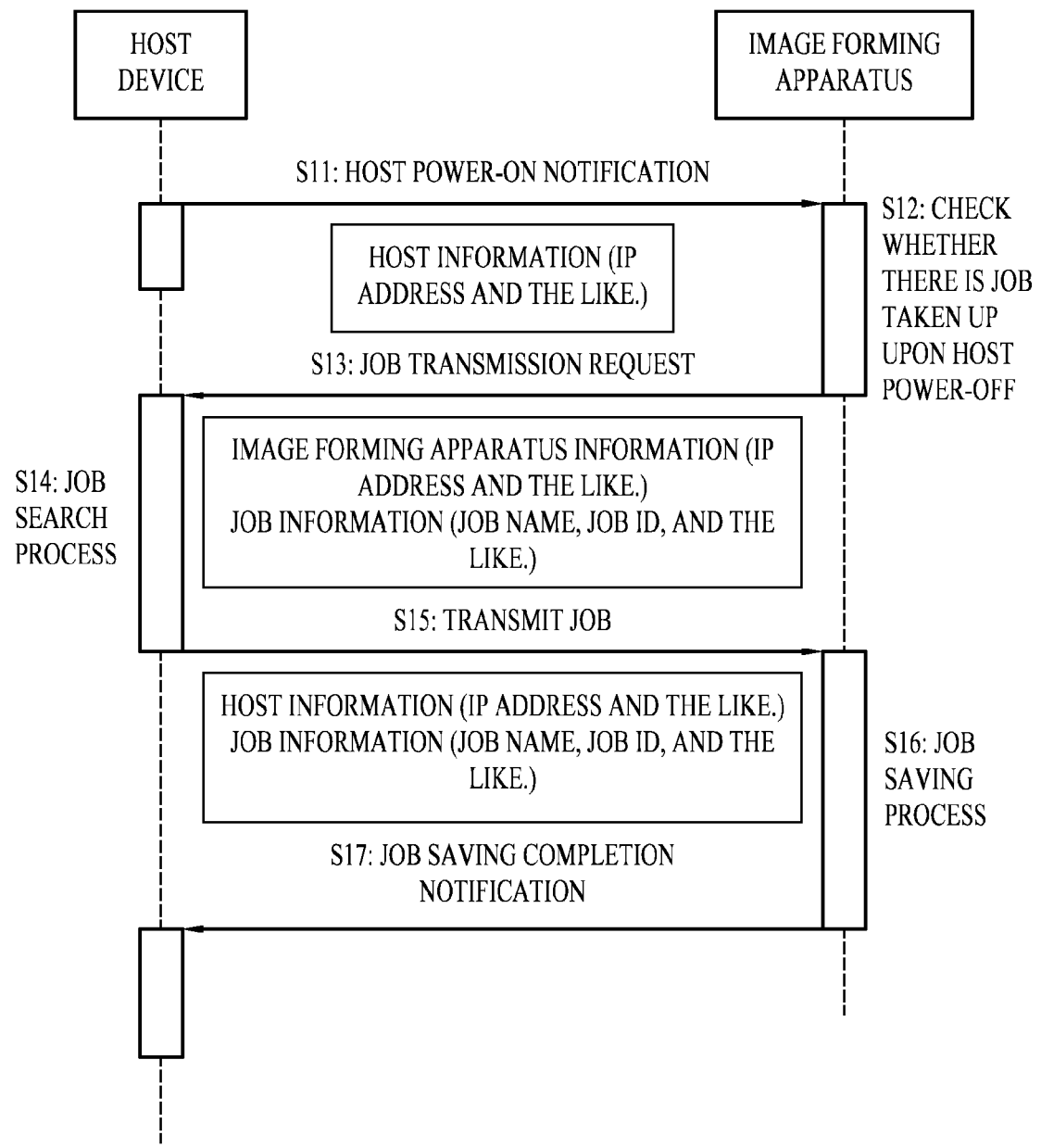
FIG. 6 is a flowchart showing steps of a start process in the image forming system.
Figure 9:
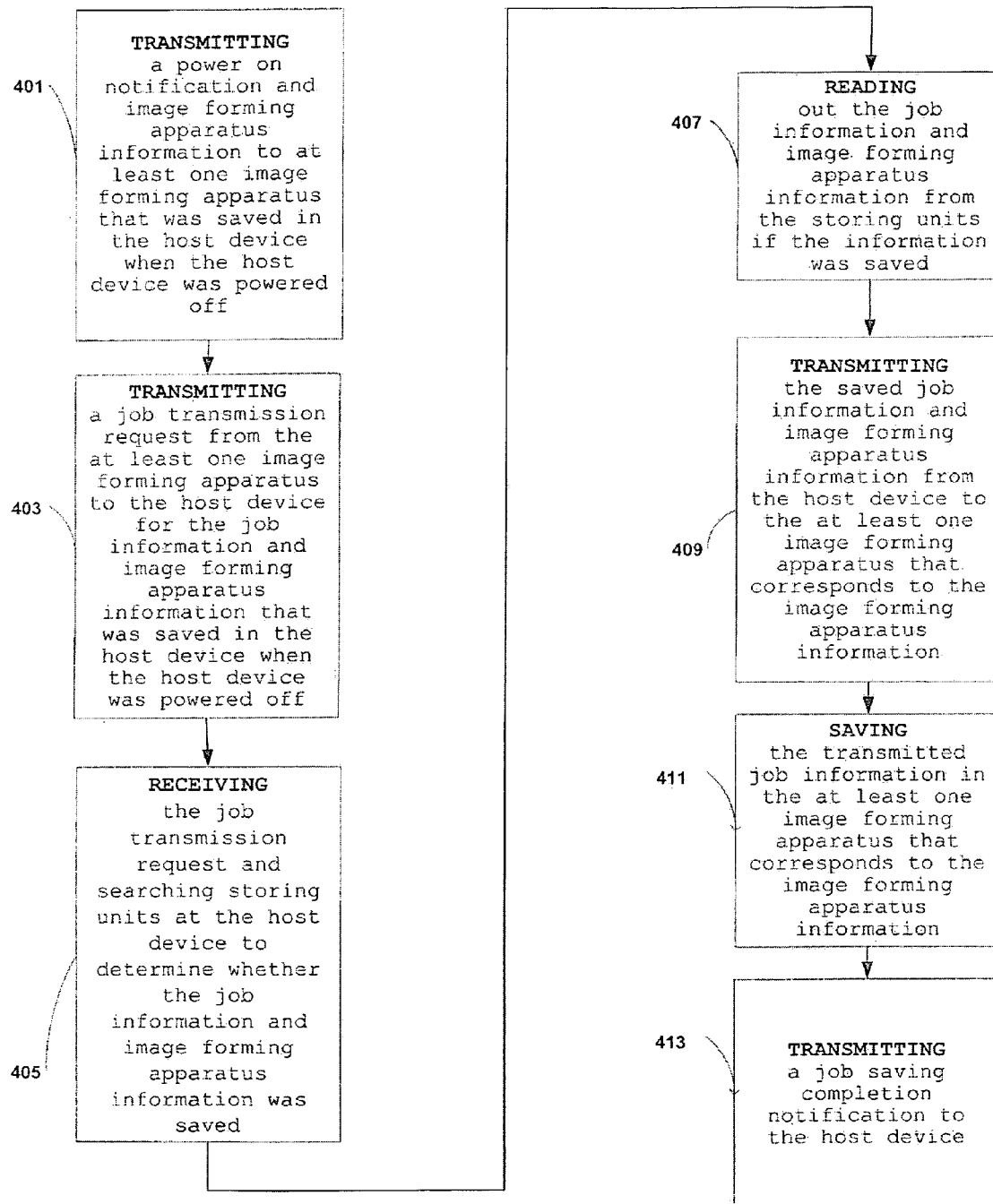
FIG. 9 is a flowchart of an exemplary embodiment of a method for powering-on an image forming system.

In the image forming system 100, when the power to the host device 10 is turned on, the controlling unit 11 of the host device 10 and the respective controlling units 21 of the image forming apparatuses 20 perform a start process according to control programs and steps shown in a flowchart of FIG. 6 and FIG. 9.

Specifically, when the power to the host device 10 is turned on, first, the controlling unit 11 of the host device 10 transmits via the communicating unit 17, a power-on notification notifying an image forming apparatus 20 having image forming apparatus information (e.g., an IP address) received when the power is turned off that the power is turned on (step S11), and as shown at 401 of FIG. 9.

When the controlling unit 21 of the image forming apparatus 20 on the network 30 receives the power-on notification transmitted from the host device 10, the controlling unit 21 determines whether or not there is a job taken up by the host device 10 when the power is turned off (step S12). If there is a job, then the controlling unit 21 causes the communicating unit 28 to transmit a job transmission request requesting the host device 10 to transmit the job (step S13) At this time, the controlling unit 21 of the image forming apparatus 20 causes the communicating unit 28 to transmit image forming apparatus information such as an IP address of the image forming apparatus and job information, together with the job transmission request, as shown at 403 of FIG. 9.

When the controlling unit 11 of the host device 10 receives the job information together with the job transmission request from the image forming apparatus 20, the controlling unit 11 searches the storing units to determine whether a job identified by the received job information is saved on the hard disk 14 or other storing units (step S14), and as shown at 405 of FIG. 9. If the job is saved, then the controlling unit 11 reads the job out from the hard disk 14 and to cause the communicating unit 17, as shown at 409 of FIG. 9, and to transmit the job to the image forming apparatus 20 (step S15), and as shown at 409 of FIG. 9.

Then, the controlling unit 21 of the image forming apparatus 20 saves the job transmitted from the host device 10, in the job saving unit 25 (step S16), and as shown at 411 of FIG. 9. When the saving of the job has been completed, the controlling unit 21 causes the communicating unit 28 to transmit a job saving completion notification notifying the host device 10 that has transmitted the saved job that the saving of the job has been completed (step S17), and as shown at 413 of FIG. 9.

Specifically, the host device 10 in the image forming system 100 includes the controlling unit 11 that transmits a power-on notification notifying an image forming apparatus 20 on the network that the power is turned on, by the communicating unit 17, when turning on the power (step S11), to search whether or not there is a job identified by job information in response to a job transmission request from the image forming apparatus 20 that has received the power-on notification (step S14), and to cause the communicating unit 17 to transmit the job identified by the job information to the image forming apparatus 20 (step S15). When the host device is powered on, the controlling unit 11 performs a start process in which a job taken up from an image forming apparatus on the network when the host device 10 is powered off is returned to its original saving state in the image forming apparatus 20.

Each image forming apparatus 20 in the image forming system 100 includes a controlling unit 21 that determines whether there is a job taken up when the host device 10 is powered off, upon receiving the power-on notification from the host device 10 (step S12), to identify the job taken up when the power is turned off, by job information, and to cause a communicating unit 28 to transmit a job transmission request requesting the host device 10 to transmit the job (step S13), and to save the job identified by the job information and transmitted from the host device 10 that has received the job transmission request, in a job saving unit 25 (step S16). The controlling unit 21 performs a start process in which a job taken up when the host device 10 is powered off is returned to its original saving state, when the host device is powered on.

As such, in the image forming system 100, since a job is taken up from an image forming apparatus 20 at timing at which the power to the host device 10 which is the holder of the job is turned off, it is possible to avoid jobs from being left in the image forming apparatus 20. Accordingly, for example, when the power to the host device 10 is turned off, for example, at nighttime, when a user goes home, during a long vacation, when a certain period of time has elapsed, or at a specified date and time, by transmitting data saved in an image forming apparatus 20 to the host device 10 which saves the data, the image forming apparatus 20 can be brought into a state in which there are no jobs in the image forming apparatus 20.

In a case where a job taken up when the power is turned off is saved in the host device 10, when the power to the host device 10 is turned on, the job taken up when the power is turned off is transmitted to its original image forming apparatus 20, whereby the job can be returned to its saving state present before the power is turned off.

Accordingly, an improvement in security in the image forming system 100 can be achieved.

Note that when the host device 10 performs a data update on a taken-up job, other host devices associated with the data are notified of the update.

In a case where an image forming apparatus 20 in the image forming system 100 saves jobs of a plurality of host devices on the network 30 in its job saving unit 25, a job of a host device 10 whose power is turned off is taken up and the job is deleted from the job saving unit 25 or a recording area of the job is released and overwriting of the recording area is allowed, whereby the image forming apparatus 20 can acquire an amount of data saving capacity corresponding to the recording area.

Figure 7:
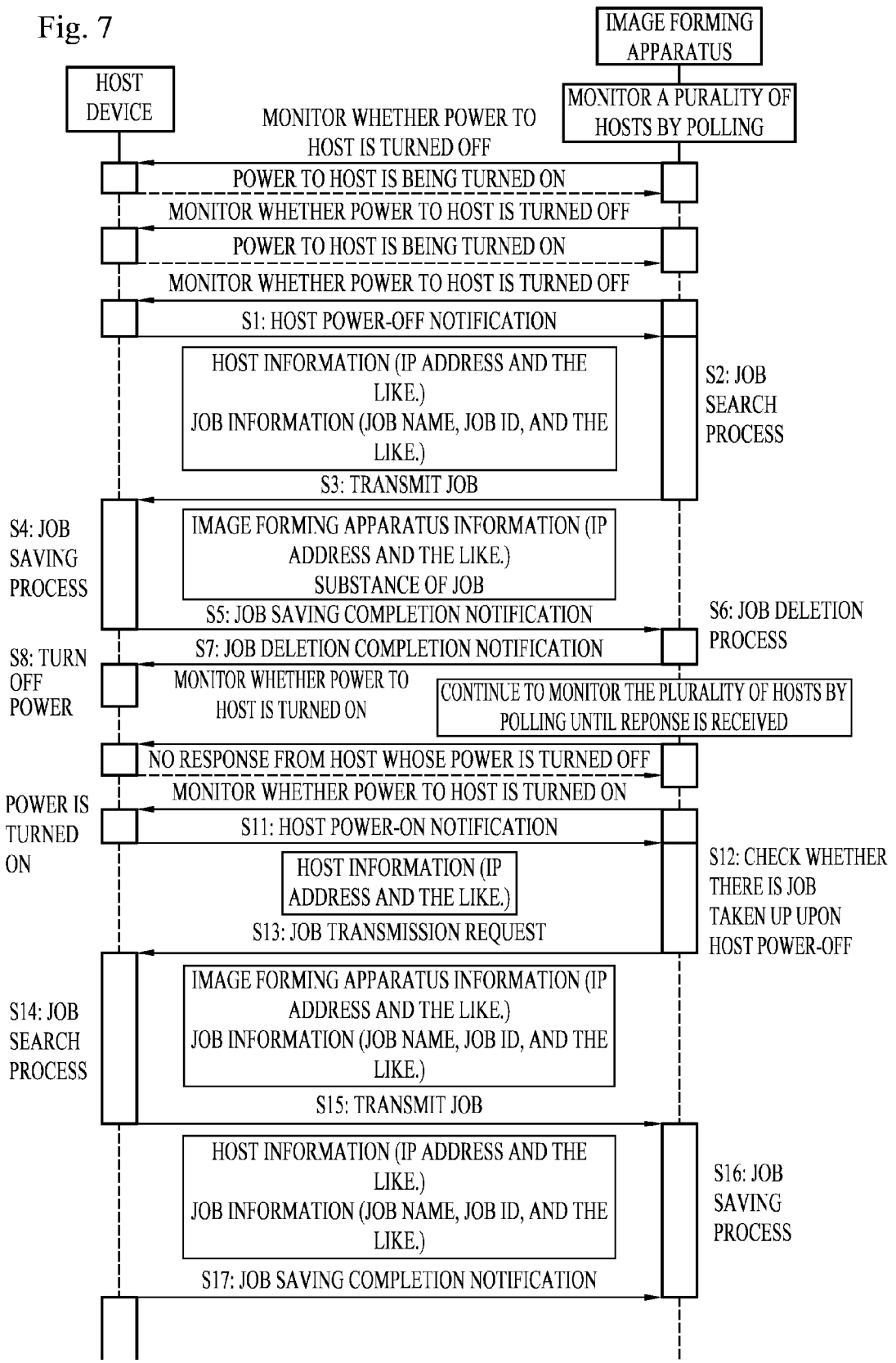
FIG. 7 is a flowchart showing processing steps for a case where in the image forming system an image forming apparatus monitors a plurality of host devices on a network by polling and performs an end process and a start process.

Furthermore, in the image forming system 100, as shown in a flowchart of FIG. 7, a controlling unit 21 of an image forming apparatus 20 may control a communicating unit 28 to transmit a polling request to a plurality of host devices on the network 30 and respective controlling units 11 of the host devices on the network 30 may control to cause their respective communicating units 17 to transmit a power-on notification or a power-off notification, in response to the polling request, whereby the image forming apparatus 20 may monitor, by polling, whether the power to the plurality of host devices on the network 30 is turned off or on and perform an end process (steps S1 to S8), as described above, with a host device from which a host power-off notification is transmitted or perform a start process (steps S11 to S17), as described above, with a host device from which a host power-on notification is transmitted.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The embodiments described hereinabove are further intended to explain best modes known of practicing it and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

This application claims priority to application no. 2007-031178, the entire disclosure of which is incorporated herein by reference. All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. An image forming system, comprising:
   a host device; and
   an image forming apparatus connected to the host device via a network, the host device including:
   a host device side communicating unit that communicates with the image forming apparatus via the network;
   a storing unit that saves a job; and
   a host device side controlling unit that transmits a power-off notification that notifies the image forming apparatus on the network via the host device side communicating unit that the power is to be turned off, transmits job information identifying the job when performing an end process, saves the job transmitted from the image forming apparatus that has received the power-off notification in the storing unit, and turns off the power, and
   the image forming apparatus including:
   a job saving unit that saves the job;
   an image forming apparatus side communicating unit that communicates with the host device via the network; and
   an image forming apparatus side controlling unit that determines whether the job identified by the job information upon receiving the power-off notification from the host device via the image forming apparatus side communicating unit, reads the job identified by the job information out from the job saving unit, causes the image forming apparatus side communicating unit to transmit the job to the host device, and deletes the job transmitted to the host device, from the job saving unit, wherein:
   the host device side controlling unit causes the host device side communicating unit to transmit a job saving completion notification that notifies the image forming apparatus that saving of the job has been completed after saving the job identified by the job information and transmitted from the image forming apparatus that has received the power-off notification in the storing unit;
   the image forming apparatus side controlling unit deletes the job transmitted to the host device from the job saving unit after receiving the job saving completion notification from the host device, and causes the image forming apparatus side communicating unit to transmit a job deletion completion notification that notifies the host device that deletion of the job has been completed; and
   the host device side controlling unit turns off the power after receiving the job deletion completion notification from the image forming apparatus.

2. The image forming system according to claim 1, wherein:
   the host device side controlling unit transmits a power-on notification that notifies the image forming apparatus on the network that the power is turned on by the host device side communicating unit, when turning on the power;
   the image forming apparatus side controlling unit identifies the job taken up when the host device is powered off by the job information upon receiving the power-on notification from the host device, and causes the image forming apparatus side communicating unit to transmit a job transmission request that requests the host device to transmit the job;
   the host device side controlling unit determines whether there is a job identified by the job information in response to the job transmission request, and causes the host device side communicating unit to transmit the job identified by the job information to the image forming apparatus; and the image forming apparatus side controlling unit saves the job identified by the job information and transmitted from the host device that has received the job transmission request in the job saving unit.

3. The image forming system according to claim 2, wherein:

the image forming apparatus side controlling unit causes the image forming apparatus side communicating unit to transmit a polling request to a plurality of host devices on the network; and respective host device side controlling units of the plurality of host devices on the network causes the respective host device side communicating units to transmit the power-on notification or the power-off notification in response to the polling request.

4. An image forming system, comprising:

a host device; and an image forming apparatus connected to the host device via a network, the host device including:

a host device side communicating unit that communicates with the image forming apparatus via the network;

a storing unit that saves a job; and a host device side controlling unit that transmits a power-off notification that notifies the image forming apparatus on the network via the host device side communicating unit that the power is to be turned off, transmits job information identifying the job when performing an end process, saves the job transmitted from the image forming apparatus that has received the power- off notification in the storing unit, and turns off the power, and the image forming apparatus including:

a job saving unit that saves the job;

an image forming apparatus side communicating unit that communicates with the host device via the network; and an image forming apparatus side controlling unit that determines whether the job identified by the job information upon receiving the power-off notification from the host device via the image forming apparatus side communicating unit, reads the job identified by the job information out from the job saving unit, causes the image forming apparatus side communicating unit to transmit the job to the host device, and deletes the job transmitted to the host device, from the job saving unit, wherein:

the host device side controlling unit transmits a power-on notification that notifies the image forming apparatus on the network that the power is turned on by the host device side communicating unit, when turning on the power;

the image forming apparatus side controlling unit identifies the job taken up when the host device is powered off by the job information upon receiving the power-on notification from the host device, and causes the image forming apparatus side communicating unit to transmit a job transmission request that requests the host device to transmit the job;

the host device side controlling unit determines whether there is a job identified by the job information in response to the job transmission request, and causes the host device side communicating unit to transmit the job identified by the job information to the image forming apparatus; and the image forming apparatus side controlling unit saves the job identified by the job information and transmitted from the host device that has received the job transmission request in the job saving unit.

5. The image forming system according to claim 4, wherein:

the image forming apparatus side controlling unit causes the image forming apparatus side communicating unit to transmit a polling request to a plurality of host devices on the network; and respective host device side controlling units of the plurality of host devices on the network causes the respective host device side communicating units to transmit the power-on notification or the power-off notification in response to the polling request.

6. A method for powering-on and restoring information in an image processing system in which at least one image forming apparatus is connected to a host device via a network, comprising:

transmitting a power on notification and image forming apparatus information to at least one image forming apparatus that was saved in the host device when the host device was powered off;

transmitting a job transmission request from the at least one image forming apparatus to the host device for the job information and image forming apparatus information that was saved in the host device when the host device was powered off;

receiving the job transmission request and searching storing units at the host device to determine whether the job information and image forming apparatus information was saved;

reading out the job information and image forming apparatus information from the storing units if the job information and image forming apparatus information was saved;

transmitting the saved job information and image forming apparatus information from the host device to the at least one image forming apparatus that corresponds to the image forming apparatus information;

saving the transmitted job information in the at least one image forming apparatus that corresponds to the image forming apparatus information;

transmitting a job saving completion notification to the host device.

7. An image forming system, comprising:

a host device; and an image forming apparatus connected to the host device via a network, the image forming apparatus further comprising a job saving unit; a job deleting unit; and a job information managing unit, wherein, upon an end process of the host device, job information is transmitted from the image forming apparatus to the host device, and wherein the job saving unit, the job deleting unit and the job information managing unit are configured to manipulate the job information and the image forming apparatus information for secure storage of jobs in the host device, where the host device further comprises:

a host device side communicating unit configured to communicate with the image forming apparatus via the network;

storing units configured to save program, data and job information; and a host device side controlling unit configured to:
  transmit a power-off notification to the image forming apparatus on the network via the host device side communicating unit that the power is to be turned off,
  transmit job information identifying a job when turning off the power,
  save the transmitted job from the image forming apparatus that has received the power-off notification in at least one of the storing units, and
  turn off the power,
where the image forming apparatus further comprises:
an image forming apparatus side communicating unit configured to communicate with the host device via the network; and
an image forming apparatus side controlling unit configured to:
  determine, upon receiving the power-off notification, whether the job identified by the job information from the host device via the image forming apparatus side communicating unit,
  read the job identified by the job information out of the job saving unit,
  cause the image forming apparatus side communicating unit to transmit the job to the host device, and
  delete the job transmitted to the host device, from the job saving unit, and
wherein the host device side controlling unit is further configured to:
  cause the host device side communicating unit to transmit a job saving completion notification, and
  save the job identified by the job information transmitted from the image forming apparatus that has received the power-off notification in the storing unit.

8. The image forming system according to claim 7,
wherein the image forming apparatus side controlling unit is further configured to:
  delete the job transmitted to the host device from the job saving unit after receiving the job saving completion notification from the host device, and
  cause the image forming apparatus side communicating unit to transmit a job deletion completion notification that notifies the host device that deletion of the job has been completed.

9. The image forming system according to claim 8,
wherein the host device side controlling unit is configured to turn off the power after receiving the job deletion completion notification from the image forming apparatus.

10. The image forming system according to claim 7,
wherein the host device side controlling unit is configured to:
  transmits a power-on notification that notifies the image forming apparatus on the network that the power is turned on by the host device side communicating unit.

11. The image forming system according to claim 10,
wherein the image forming apparatus side controlling unit is configured to:
  identify the job taken up when the host device was powered off by the job information upon receiving the power-on notification from the host device, and
  cause the image forming apparatus side communicating unit to transmit a job transmission request that requests the host device to transmit the job.

12. The image forming system according to claim 11,
wherein the host device side controlling unit is configured to:
  determine whether there is a job identified by the job information in response to the job transmission request, and
  cause the host device side communicating unit to transmit the job identified by the job information to the image forming apparatus.

13. The image forming system according to claim 12,
wherein the image forming apparatus side controlling unit is configured to:
  save the job identified by the job information and transmitted from the host device that has received the job transmission request in the job saving unit.

14. The image forming system of claim 7, wherein the storing units are at least one of RAM, EEPROM and Hard Disk Drives.

15. A non-transitory computer-readable medium containing executable instructions that, when executed by a computer causes the computer to implement a method for powering-off and storing information in an image processing system in which at least one image forming apparatus is connected to a host device via a network, comprising:
  transmitting a power-off notification, host information and job information to the at least one image forming apparatus;
  searching the at least one image forming apparatus to determine whether a job that matches the job information is saved therein;
  reading out the job information from the at least one image forming apparatus when the job information is saved;
  receiving the job information and image forming apparatus information to the host device when the job information is read out from the at least one image forming apparatus;
  saving the transmitted job information and image forming apparatus information in the host device;
  transmitting a job saving completion notification from the host device to the at least one image forming apparatus;
  receiving a job deletion complete notification to the host device from the at least one image forming apparatus; and
  turning off power to the host device.

16. A non-transitory computer-readable medium containing executable instructions that, when executed by a computer causes the computer to implement a method for powering-on and restoring information in an image processing system in which at least one image forming apparatus is connected to a host device via a network, comprising:
  transmitting a power on notification and image forming apparatus information to at least one image forming apparatus that was saved in the host device when the host device was powered off;
  receiving a job transmission request from the at least one image forming apparatus at the host device for the job information and image forming apparatus information that was saved in the host device when the host device was powered off;
  receiving the job transmission request and searching storing units in the host device to determine whether the job information and image forming apparatus information was saved;
  reading out the job information and image forming apparatus information from the storing units if the information was saved;

transmitting the saved job information and image forming apparatus information from the host device to the at least one image forming apparatus that corresponds to the image forming apparatus information;

receiving a job saving completion notification to the host device.

* * * * *